United States Patent [19]
Reiff

[11] Patent Number: 5,313,464
[45] Date of Patent: May 17, 1994

[54] FAULT TOLERANT MEMORY USING BUS BIT ALIGNED REED-SOLOMON ERROR CORRECTION CODE SYMBOLS

[75] Inventor: Francis H. Reiff, Manitou Springs, Colo.

[73] Assignee: Digital Equipment Corporation, Maynard, Mass.

[21] Appl. No.: 878,749

[22] Filed: May 5, 1992

Related U.S. Application Data

[63] Continuation-in-part of Ser. No. 376,357, Jul. 6, 1989.

[51] Int. Cl.$^5$ .............................................. G06F 11/10
[52] U.S. Cl. ...................................... 371/2.1; 371/40.1
[58] Field of Search ..................... 371/2.1, 2.2, 38.1, 371/40.4, 40.1, 39.1

[56] References Cited

U.S. PATENT DOCUMENTS

| | | | |
|---|---|---|---|
| 4,782,490 | 11/1988 | Tenengolts | 371/40 |
| 5,099,484 | 3/1992 | Smelser | 371/38.1 |
| 5,134,619 | 7/1992 | Henson et la. | 371/40.1 |
| 5,140,592 | 8/1992 | Idleman et al. | 371/8.1 |
| 5,172,379 | 12/1992 | Burrer et al. | 371/37.1 |

Primary Examiner—Robert W. Beausoliel, Jr.
Assistant Examiner—Phillip Vales
Attorney, Agent, or Firm—Arnold, White & Durkee

[57] ABSTRACT

A symbol interleaving method for organizing data in a semiconductor memory such that fault tolerance of the memory is optimized when used in conjunction with a Reed-Solomon burst error correcting code. The Reed-Solomon symbols are aligned with respect to the bus bits of the memory such that the impact of a bus bit failure that affects all memory devices in the memory using the bus is constrained within the correction capability of the ECC. The symbols also are distributed among the memory devices in order to maximize fault tolerance. Up to two memory devices in the preferred embodiment may fail without exceeding the correction capability of the code.

5 Claims, 2 Drawing Sheets

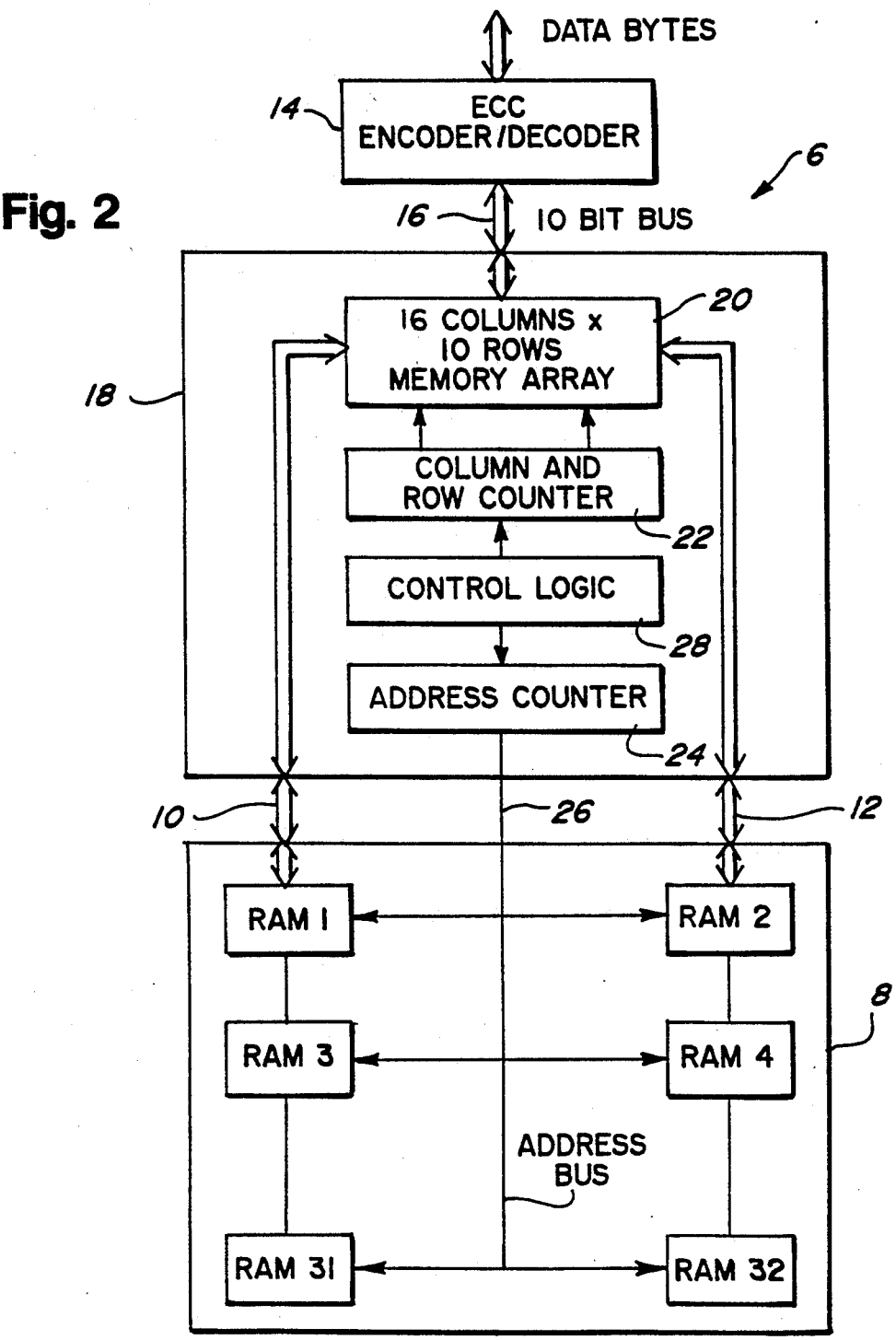

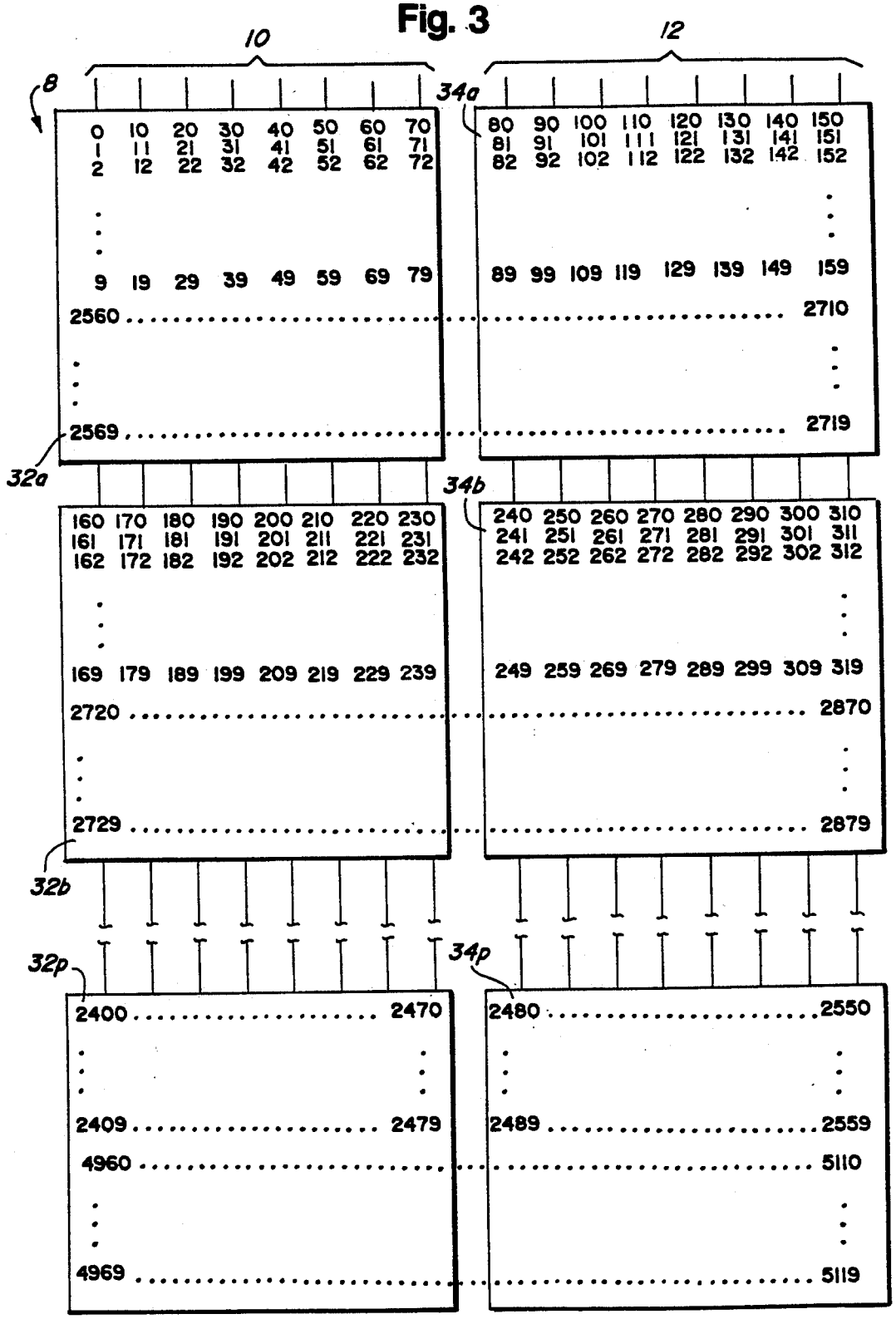

FAULT TOLERANT MEMORY USING BUS BIT ALIGNED REED-SOLOMON ERROR CORRECTION CODE SYMBOLS

RELATED APPLICATION

This is a continuation-in-part of application Ser. No. 07/376,357, filed Jul. 6, 1989, by Francis H. Reiff, and entitled Fault Tolerant Memory.

FIELD OF THE INVENTION

The present invention relates to data storage techniques, and more particularly to methods for organizing data in a memory to optimize the memory's tolerance for system faults.

BACKGROUND OF THE INVENTION

Error correction codes (ECC's) have been used to protect data stored in a wide variety of memory systems. Magnetic discs, magnetic tapes, laser optical discs and semiconductor memories have all been protected by various ECC's. Some codes can correct only a single bit and require only a small number of check bits while others can correct many bits but require a much larger number of check bits. Those codes that correct many bits are sometimes referred to as burst ECC's.

In order to more effectively utilize simple, single error correcting codes, various data organizations have been adopted that disperse the data such that a single occurrence of an error does not show up as a burst error, thus exceeding the correction capability of the code. For instance, one application has used a four bit Hamming code plus a parity bit to protect a byte of data. The total data word is then 13 bits wide. The data is spread out via an interleaving technique such that each adjacent bit in the data byte is 14 bits away. This technique involves writing to the rows of a memory matrix and reading from columns.

Another application of this same technique has been used to disperse the bits of a convolution code and achieve burst error correction. The technique has also been applied multiple times in yet another application to disperse the bits of a data byte more than a single interleave allows.

The applications of bit-level interleaving mentioned above apply simple ECC's to relatively error-prone information channels. They attempt to maximize the effectiveness of these simple codes relative to the error characteristics of the channel.

The characteristics of a semiconductor memory, such as a write cache for a disc drive storage array, differ considerably from an ordinary information channel to which the prior art applications have been directed in that the memory is normally relatively error-free, although prone to occasional catastrophic failure due to the loss of a data bus bit or memory device in the memory array that comprises the semiconductor memory. It is desirable that such a memory utilizes a powerful multi-burst error correction code, such as described in U.S. Pat. No. 5,107,503 by Riggle et al., entitled High Bandwidth Reed Solomon Encoding, Decoding and Error Correcting Circuit, which is a continuation of Ser. No. 136,206, filed Dec. 21, 1987, now abandoned, which is a continuation of Ser. No. 88,378, filed Aug. 24, 1987, now abandoned, to provide fault tolerance for such catastrophic bus errors or entire memory device failures. However, in known prior art memories the organization of data that is written is not optimal to maximize resistance to catastrophic memory failure, even with the utilization of the Reed-Solomon ten bit symbol error correction code described above. This is partly due to the fact that a data bus error or memory device failure can cause the loss of more than one ten bit symbol, thus limiting the effectiveness of the error correction code in protecting the integrity of data blocks.

Therefore, it is desirable to re-order or organize the data stored as ten bit symbols in the memory to maximize resistance of stored data blocks to catastrophic data bus errors or memory device failure.

SUMMARY OF THE INVENTION

In the preferred embodiment, the present invention organizes the storage of ten-bit Reed-Solomon error correction code symbols in memory devices having eight-bit bytes. The present invention applies a very powerful multi-burst error correction code, as described in U.S. Pat. No. 5,107,503 by Riggle et al., entitled High Bandwidth Reed Solomon Encoding, Decoding and Error Correcting Circuit, which is a continuation of Ser. No. 136,206, filed Dec. 21, 1987, now abandoned, which is a continuation of Ser. No. 88,378, filed Aug. 24, 1987, now abandoned, to a relatively error free information channel, a semiconductor memory. The ten-bit Reed-Solomon error correction code symbols are data bus bit aligned in each of a plurality of RAM devices and distributed among the plurality of RAM devices. The result is a memory that has its data organized and distributed to provide fault tolerance to catastrophic bus errors or entire memory device failures. These failures, although rare, are of major importance in certain memories, such as a write cache in a disc drive array. In this application, data is present in the write cache from many spindles, thus increasing the need for data integrity.

The error correction utilized by the present invention preferably operates on ten bit symbols, and uses 67 check symbols to correct up to 32 symbols in a 512 symbol data block. The invention maximizes the effectiveness of this code through symbol-level interleaving, rather that bit-level interleaving used in known systems.

The ten-bit Reed-Solomon error correction code symbols are created by an encoder/decoder and are present on a ten-bit bus. A data converter converts the ten-bit Reed-Solomon error correction code symbols so that they are conveyable via two eight bit buses or a sixteen-bit bus, with all of the ten bits of each ten-bit symbol being conveyable via one of the sixteen bits of the bus. A 640 byte data block comprising 512 ten-bit symbols using the Reed-Solomon error correction code is stored in twenty byte groups of each of thirty-two eight-bit by 128 kilobyte static RAM devices. The thirty-two RAM devices are organized in two columns of sixteen with all devices of one column receiving the eight least significant bits of the sixteen bit bus and all devices of the other column receiving the eight most significant bits of the sixteen bit bus. The ten-bit symbols are data bus bit aligned or organized vertically in the RAM devices so that the same bit positions of ten different bytes of a given RAM device each contain one of the ten bits of a ten-bit symbol. The ten-bit Reed-Solomon error correction code symbols are also distributed between the memory devices so that each of the thirty-two RAM devices contains only sixteen data bus bit aligned ten-bit symbols within a group of twenty bytes. The Reed-Solomon error correction code can correct a predetermined number of symbols. In the preferred embodiment, the Reed-Solomon Error Correction Code can correct thirty-two symbols. Accordingly, any two RAM devices can fail, or any one bit of the sixteen bit bus can fail, and the Reed-Solomon ECC will preserve all data.

BRIEF DESCRIPTION OF THE DRAWINGS

The advantages of the invention will become apparent upon reading the following detailed description and upon reference to the accompanying drawings, in which:

FIG. 1 is an example of a non-optimal scheme for accommodating ten bit symbols in memory devices having multiples of eight bits.

FIG. 2 is a block diagram of a memory system including an ECC system which is suitable to use in the present invention.

FIG. 3 is a block diagram illustrating the organization of memory according to the present invention.

While the invention is susceptible to various modifications and alternative forms, specific embodiments thereof has been shown by way of example in the drawings and will herein be described in detail. It should be understood, however, that the invention is not intended to be limited to the particular forms disclosed. On the contrary, the applicants' intention is to cover all modifications, equivalents, and alternatives falling within the spirit and scope of the invention as defined by the appended claims.

DETAILED DESCRIPTION OF THE PREFERRED EMBODIMENT

Referring to the drawings, wherein like reference characters designate like or corresponding parts throughout the views, FIG. 1 is a block diagram of one simple scheme for accommodating ten-bit Reed-Solomon symbols on a bus or device with multiples of eight bits with a non-optimal data organization. These ten-bit Reed-Solomon symbols may be used to correct up to thirty-two symbols of a 512 symbol, or 640 byte block of Reed-Solomon ECC encoded data. Ten-bit symbol $2a$ comprises bits 0–9, symbol $2b$ comprises bits 10–19, symbol $2c$ comprises bits 20–29 and symbol $2d$ comprises bits 30–39. The four ten-bit symbols $2a$ through $2d$ are loaded into five consecutive eight-bit random access memory bytes $4a$ through $4e$, to accommodate the symbols in the forty bits provided by the five memory bytes $4a$ through $4e$. The alignment between the symbols and the bytes is also shown, with byte $4a$ comprising bits 0–7, $4b$ comprising bits 8–15, $4c$ comprising bits 16–23, $4d$ comprising bits 24–31 and $4e$ comprising bits 32–39. Byte $4a$ and byte $4e$ include only one symbol, all other bytes $4b$–$4d$ include more than one symbol. Thus if any of the bytes $4b$ through $4d$ fail, two of the symbols $2a$ through $2d$ are lost. A fault tolerant memory can be organized based upon this scheme, but more memory bytes must be used.

FIG. 2 is a block diagram of a memory system including an ECC system which is suitable to use in the present invention. A memory system 6, such as a cache for a central processing unit (CPU) or a storage device, includes a memory array 8. The memory array 8 has an array of 32 static random access memory devices (RAM's) which are each eight bits wide by 128 kilobytes long to provide a total memory capacity of 4 megabytes (4,194,304 bytes). As will be understood by one of ordinary skill in the field, a different number of memory devices arranged in a different number of columns could be used provided the principles of the present invention are maintained. The memory array 8 transfers its data on two eight-bit wide input/output data buses 10 and 12 which are the equivalent of and operate as one sixteen-bit wide input/output data bus.

The ten-bit Reed-Solomon ECC used with the memory array 8 is provided by an ECC encoder/decoder 14. In the preferred embodiment, the powerful multiburst error correction code described in U.S. Pat. No. 5,107,503 by Riggle et al., entitled High Bandwidth Reed-Solomon Encoding, Decoding and Error Correcting Circuit, is used and is incorporated herein by reference. This code is a symmetric Reed-Solomon code over the Galois Field $GF(2)^{10}$ generated by the primitive polynomial $X^{10}+X^3+1$. The generator polynomial for the code generates 67 check symbols per code word and, therefore, the code can correct up to 32 symbols per code word in error. The encoder/decoder 14 receives 4,450 bits of data adds 670 bits of Reed-Solomon error correcting code symbols, for a total of 5,120 bits or 512 symbols. The encoded/decoder 14 decodes and encodes 512 ten-bit symbols which are transferred on a ten-bit data bus 16.

The symbols on the data bus 16 are not suitable for coupling to the memory array 8 via the two eight-bit data buses 10 and 12. This is because the two data buses 10 and 12 are equivalently sixteen bits wide and the data bus 16 is ten bits wide. Furthermore, the ten-bit symbols on the data bus 16 must be aligned with the bytes of the RAM's in the memory array 8 to avoid wasting memory bits in the RAM's of the memory array 8. A data converter 18, coupling the two eight-bit data buses 10 and 12 to the data bus 16, provides the necessary bit conversion, data alignment and storage organization to maximize the fault tolerance of the storage device when used in conjunction with an error correcting code (ECC). The data converter 18 also optimizes the fault tolerance for the ECC encoder/decoder 14 so that either two of the 32 RAM's in the memory array 8 or one data bus bit of the two data buses 10 and 12 can fail without loss of data. Data converter 18 provides the conversion between standard Reed-Solomon ten-bit symbols on bus 16 and the code illustrated in FIG. 3. With an understanding of the data organization of FIG. 3, therefore, data converter 18 may be implemented in any one of a number of well known ways, such as by way of a simple gate array having special memory cells organized in an array of ten rows and sixteen columns where ten-bit symbols are written to successive columns until the array is full and then sixteen-bit data is read from the rows and appears on data buses 10 and 12.

In the preferred embodiment, the data converter 18 comprises a memory array 20 which receives the Reed-Solomon ten-bit error correction code symbols over the ten-bit bus 16 from the encoder/decoder 14. The memory array 20 has ten rows and sixteen columns. Accordingly, sixteen ten-bit Reed-Solomon error correction code symbols are written the sixteen columns of the memory array 20. A column counter and row counter 22 provides a pointer to the column of memory array 20 and a pointer to the row of memory array 20 being accessed. An address counter 24 provides external memory addresses over line 26 and distributes the Reed-Solomon error correction code symbols to the memory 8 so that for each 640 byte block or 512 ten-bit symbols no more than sixteen ten-bit symbols are stored per RAM. A control 28 provides the timing for the data converter 18 by initializing the address counter 24 to a predetermined value at the beginning and providing clocking signals thereafter and by initializing the column/row counter 22 and providing clocking signals therafter as would be well known to one of ordinary skill in the field. Accordingly, a first group of sixteen ten-bit Reed-Solomon ECC symbols are written to the sixteen columns and then data flow stops while each row is read out over the two eight-bit buses 10 and 12 or over a sixteen bit bus which is divided into two portions. It is within the scope of the present invention to use more than one memory array 20 and to alternate writing and reading operations so that data flow is continuous as would be understood to one of ordinary skill in the field.

FIG. 3 illustrates the organization of data within memory array 8. For clarity, the organization of only one 640 byte block of ECC encoded data is shown, although it should be understood that the entire contents of memory array 8, which may be 4 megabytes, is similarly organized.

The memory array 8 comprises any suitable number of RAM's of which thirty-two RAM's 32a through 32p and 34a through 34p are illustrated and are used to store one 640 byte block of data according to the present invention. Twenty memory bytes or storage locations, each having eight bits, of each RAM 32a through 32p and 34a through 34p are illustrated and are used to store one 640 byte block of encoded data. The thirty-two RAM's are arranged in two columns of sixteen, with all RAM's of one column, RAM's 32a through 32p, receiving the least significant eight-bits, shown at bus 10, and all RAM's of the other column, RAM's 34a through 34p, receiving the most significant eight bits, shown at bus 12. However, it will be apparent to one of ordinary skill in the field that the bits connected to the buses 10 and 12 can be arranged in any combination. Each memory byte is illustrated as a horizontal eight-bit line within the respective RAM. Other blocks of 640 bytes of encoded data are stored in other groups of twenty bytes in the respective RAM's.

The Reed-Solomon error correction code data from the ECC encoder/decoder 14 is converted by data converter 18 into ten-bit Reed-Solomon error correction code symbols and stored in memory array 8 in an interleaved fashion. As shown in FIG. 3, the first ten-bit symbol, comprising bits 0 through 9 which are simply illustrated in FIG. 3 as the numerals 0 through 9, occupies the first bit positions of the first ten bytes of RAM 32a respectively. Likewise, the second ten-bit symbol, comprising bits 10 through 19, occupies the second bit positions of the first ten bytes of RAM 32a respectively. This pattern of organization continues such that all eight bit positions of the first ten bytes of RAM 32a are occupied with the first eight ten-bit symbols.

By way of further examples, the ninth ten-bit symbol is received by RAM 34a via the least significant of the most significant lines, shown at bus 12, and occupies the first bit positions of the first ten bytes of RAM 34a respectively. The 256th ten-bit symbol occupies the eighth bit positions of the first ten bytes of RAM 34p, and the 257th ten-bit symbol occupies the first bit positions of the second ten bytes of RAM 32a. The last or 512th ten-bit symbol occupies the eighth bit positions of the second ten bytes of RAM 34p respectively.

With the data organization described above, only sixteen ten-bit symbols are stored in each of the RAM's 32a through 32p and 34a through 34p per block. Since the ten-bit Reed-Solomon ECC enables the encoder/decoder 14 can correct thirty-two of the ten-bit symbols, two of the RAM's 32a through 32p and 34a through 34p can fail without loss of data. Alternatively, a failure of one of the bits of the two eight bit data buses 10 and 12 can occur, resulting in the loss of thirty-two of the ten-bit symbols without loss of data.

The fault tolerances of the memory system 6 described above are optimal and are represented by the relationship:

$$\frac{\text{Ram's failed}}{\text{Total RAM's}} = \frac{\text{Bits correctable by } ECC}{\text{Total bits in data block}} = \frac{1}{16}$$

The data bus bit aligned symbol scheme also allows:

$$\frac{\text{Bus bits failed}}{\text{Total bus bits}} = \frac{\text{Bits correctable by } ECC}{\text{Total bits in data block}} = \frac{1}{16}$$

Of course, other conversion schemes can be implemented in accordance with the present invention, and it is within the scope of the invention to provide for storing and transferring data symbols with any first number of bits sequentially fed on each bit of a data bus of a second number of bits to data of the second number of bits in length on each bit of a data bus of the first number of bits to provide optimum data organization. In particular, since most memory devices have words in multiples of bytes, or eight bits, the present invention is particularly advantageous in converting ten bit symbols on ten bit data buses to data on a data bus of eight, sixteen, thirty-two, or more bits.

In an alternative embodiment, the ECC encoder/decoder 14 uses the powerful multiburst error correcting code described in U.S. Pat. No. 4,413,339 by Riggle et al., entitled Multiple Error Detecting and Correcting System Employing Reed-Solomon Codes which is incorporated herein by reference. This code is capable of correcting eight symbols of ten-bits each in a 640 byte block of data including check symbols. In this embodiment, the check symbols consist of seventeen ten-bit symbols and the customer data consists of four hundred and ninety-five symbols Since the code is capable of correcting only eight ten-bit symbols, no RAM device in the memory 8 can contain more than four symbols since two memory device failures are to be tolerated without the loss of data. Accordingly, the minimum number of memory devices is one hundred twenty-eight which is derived by taking the number of symbols (512) divided by the number of symbols in error tolerated per device (4). Furthermore, since a single bus bit failure is to be tolerated without the loss of data, the number of symbols per block conveyed over a bus bit must be eight or less. Therefore, a sixty-four bit bus is needed, which is derived by taking the number of symbols (512) divided by the number of symbols in error tolerated per bus bit (8).

Using available 1 megabit×4 dynamic RAM technology, a data organization consisting of one hundred twenty-eight 1 megabit×4 DRAMS organized as a sixty-four bit bus tolerates one bus bit failure or the failure of two memory devices without the loss of data. In this memory, eight banks of sixteen memory devices are needed. Each memory device stores four symbols data bus bit aligned per 640 byte block of data and each bus bit conveys a maximum of eight symbols per 640 byte block of data.

Thus there has been described herein a symbol level interleaving method of optimizing the organization of data in a memory having a plurality of RAM devices with the data comprising symbols that are data bus bit aligned in each of the plurality of RAM's and distributed among the plurality of RAM's to provide fault tolerance to catastrophic bus errors or entire memory device failures.

It will be understood that various changes in the details, arrangement and configuration of the parts and systems which have been described and illustrated above in order to explain the nature of the present invention may be made by those skilled in the art within the principle and scope of the present invention as expressed in the appended claims.

What is claimed is:

1. In a memory having a plurality of random access memory devices and being adapted to receive over a multi-bit data bus multiple bit Reed-Solomon error correction code symbols corresponding to a block of data, a symbol level interleaving method for organizing said multiple bit Reed-Solomon error correction code symbols in said memory to maximize resistance to failure of bit paths of said data bus or failure of said memory devices, said method comprising the steps of:

conveying the bits of a predetermined number of said Reed-Solomon error correction code symbols to each one of said memory devices via the bit paths of said data bus; and storing the bits of each of said Reed-Solomon error correction code symbols in like bit positions of a plurality of memory bytes in said memory devices, the number of memory bytes being equal to the number of bits in each of said symbols.

2. The method recited in claim 1 wherein said multiple bit Reed-Solomon error correction code corrects a predetermined maximum number of said symbols and wherein said step of storing includes storing no more than one-half of said predetermined maximum number of symbols correctable by said Reed-Solomon error correction code in each of said memory devices.

3. A memory system for storing a block of data arranged into multiple-bit Reed-Solomon error correction code symbols and having a plurality of random access memory devices arranged into at least two columns with said memory devices of one of said columns being connected to a first group of bit paths of a data bus for conveying said symbols to said memory devices and with said memory devices of another one of said columns being connected to a second group of bit paths of said data bus, said memory system comprising:

means for conveying the bits of a predetermined number of said symbols to each one of said memory devices via the bit paths of said data bus; and means for storing the bits of each of said symbols in like bit positions of a plurality of memory bytes in said memory devices, the number of memory bytes being equal to the number of bits in each of said symbols.

4. A method for organizing a 640 byte block of data into 512 ten-bit Reed-Solomon error correction code symbols in a memory wherein said Reed-Solomon error correction code corrects up to thirty-two of said symbols in said data block and said memory has thirty-two random access memory devices arranged in two columns with the memory devices of one of the columns connected to a first group of eight bit paths of a data bus for conveying the symbols to the devices and the memory devices of the other of the columns connected to a second group of eight bit paths of the data bus, said method comprising the steps of:

distributing said 512 ten-bit Reed-Solomon error correction code symbols among said thirty-two random access memory devices by conveying the bits of sixteen of said symbols to each one of said memory devices via the bit paths of said data bus; and data bus bit aligning each of said 512 ten-bit Reed-Solomon error correction code symbols in each of said thirty-two random access memory devices by storing the bits of each of said sixteen symbols in like bit positions of ten memory bytes of each of said memory devices.

5. A symbol level interleaving method of organizing a block of data in a memory having a plurality of random access memory devices, said method comprising the steps of:

encoding said block of data into multi-bit Reed-Solomon error correction code symbols;

converting said multi-bit Reed-Solomon error correction code symbols into a format transferable over a multi-bit data bus to said memory;

distributing said converted multi-bit Reed-Solomon error correction code among said plurality of memory devices by conveying the bits of a predetermined number of said Reed-Solomon error correction code symbols to each one of said memory devices via the bit paths of said data bus; and data bus bit aligning said Reed-Solomon error correction code symbols in each of said memory devices by storing the bits of each of said Reed-Solomon error correction code symbols in like bit positions of a plurality of memory bytes in said memory devices, the number of memory bytes being equal to the number of bits in each of said symbols.

* * * * *